(12) United States Patent
Lykke et al.

(10) Patent No.: US 6,359,031 B1
(45) Date of Patent: Mar. 19, 2002

(54) PARTICLES HAVING A POLYMERIC SHELL AND THEIR PRODUCTION

(75) Inventors: Mads Lykke, Bronshoj (DK); Kishor Kumar Mistry, West Yorkshire (GB); Ole Simonsen, Soborg (DK); Kenneth Charles Symes, West Yorkshire (GB)

(73) Assignee: Ciba Specialty Chemicals Water Treatments Limited, West Yorkshire (GB)

( * ) Notice: Subject to any disclaimer, the term of this patent is extended or adjusted under 35 U.S.C. 154(b) by 0 days.

(21) Appl. No.: 09/722,058

(22) Filed: Nov. 27, 2000

Related U.S. Application Data

(62) Division of application No. 08/860,564, filed on Feb. 17, 1998, now Pat. No. 6,225,372.

(30) Foreign Application Priority Data

| Dec. 29, 1995 | (GB) | ............................................. 9526707 |
| Apr. 18, 1996 | (GB) | ............................................. 9608026 |
| Apr. 18, 1996 | (GB) | ............................................. 9608032 |
| May 28, 1996 | (GB) | ............................................. 9611061 |
| May 28, 1996 | (GB) | ............................................. 9611065 |

(51) Int. Cl.$^7$ .......................... C08F 8/30; C08G 18/00; C08L 83/00; C08L 75/00; A01N 25/00
(52) U.S. Cl. ...................... 523/201; 264/4.33; 264/4.7; 424/405; 424/408; 424/417; 424/490; 428/423.1; 428/474.4; 523/200; 525/902
(58) Field of Search ................................. 523/201, 200; 525/902; 264/4.33, 4.7; 424/405, 408, 417, 490; 428/423.1, 474.4

(56) References Cited

U.S. PATENT DOCUMENTS 5,705,174 A  1/1998  Benoff et al.

FOREIGN PATENT DOCUMENTS

| EP | 0 671 206 | 9/1995 | ............ B01J/13/16 |
| EP | 0 747 116 | 12/1996 | ............ B01J/13/16 |
| WO | WO 92/20771 | 11/1992 | ............ C11D/3/386 |

OTHER PUBLICATIONS

Journal of Microencapsulation, vol. 11, No. 6, Nov. 1994, pp. 603–614.
International Search Report.

*Primary Examiner*—Patrick D. Niland
(74) *Attorney, Agent, or Firm*—Sughrue Mion, PLLC

(57) ABSTRACT

Particles have a hydrophilic core, for instance including an enzyme and a polymer, surrounded by a shell formed by interfacial condensation polymerisation in the presence of a polymeric stabilizer. Preferably the polymeric stabilizer is a random copolymer which will concentrate at the interface between oil and water and association by ionic interaction, condensation or otherwise is achieved between the stabilizer and one of the reactants before reaction with the other reactant. Dispersions of aqueous capsules in an aqueous medium are also disclosed.

20 Claims, No Drawings

PARTICLES HAVING A POLYMERIC SHELL AND THEIR PRODUCTION

This application is a continuation of U.S. Application No. 08/860,564, filed Feb. 17, 1998, now U.S. Pat. No. 6,222,372 B1, which was the National Stage of International Application No. PCT/GB96/03233, filed Dec. 23, 1996.

This invention relates to condensation polymers and their production and in particular to membranes, especially capsule walls, formed of such polymers. In particular, the invention relates to the production of particles which have a core of core material encapsulated within a polymeric shell, including the production of such particles as a substantially stable dispersion in a liquid.

Various methods are known for forming capsules having a shell core configuration. One method involves coacervation of a polymer around the core. Methods of forming a coacervate coating from a polymer solution around an aqueous core, and which are suitable for the manufacturer of micro capsules that can be included in a liquid detergent concentrate, are described in, for instance, the EP356239 and WO92/20771. It is difficult to obtain by this technique a product in which the enzyme is retained satisfactorily in the particles while in the concentrate but is reliably released from the particles when the concentrate is diluted into wash water.

Another known method for making the shell of capsules having a shell core configuration is interfacial polymerisation in which one or more monomers polymerise at the interface between a dispersed phase and a continuous phase to form a shell around the dispersed phase. One particular type of interfacial polymerisation is interfacial condensation (IFC) polymerisation. The polymer shell forms at the interface between an oil phase and an aqueous phase as a result of reaction between a water soluble IFC reactant (in the aqueous phase) and an oil soluble IFC reactant (in the oil phase).

IFC polymerisation has been applied for encapsulating a hydrophobic or oil core by forming an oil-in-water dispersion and causing IFC polymerisation around each dispersed oil droplet. Methods for performing this reaction have been developed to allow reasonably satisfactory encapsulation. However these methods are of no value when the core material is aqueous or hydrophilic and, instead, it is then necessary to conduct the IFC polymerisation in a water-in-oil dispersion, i.e. in a dispersion in which the aqueous or hydrophilic core material is dispersed in a continuous oil phase.

Although it is suggested in some patent examples, e.g., in JP-A-63-137996 that the water-in-oil process is satisfactorily operable, we have found that in practice it is not easy to obtain satisfactory results using environmentally acceptable materials. For instance there is a risk that a substantial amount of the product may be a sediment or not encapsulated, and the process may require the use of a halogenated hydrocarbon. This may have good properties for the IFC polymerisation but is now considered environmentally undesirable. The process can be particularly difficult when it is desired to achieve a small particle size (e.g. at least 90% by weight below 30 $\mu$m) and a product in which substantially all the core material is enclosed within such particles and the particles are substantially stably dispersed in a liquid.

It might be thought that the formation of a fine dispersion, i.e. an emulsion, would be promoted by the use of a water-in-oil emulsifier. However we have found that if we use a conventional water-in-oil emulsifier such as Span 85 (trade mark) it is difficult to obtain a dispersion of satisfactory encapsulated particles in oil, especially when the amount of dispersed phase is reasonably high. Increasing the amount or effectiveness of a conventional type of water-in-oil emulsification system does not improve the result. Instead, it seems to tend to reduce satisfactory shell formation and to increase the risk of non-uniformity in the shell.

In EP-A-0671206, an IFC process is described for making the shell of microcapsules having a size below 1 $\mu$m and is characterised by the use of a block copolymer as a protective colloid. A mixture of one of the IFC reactants with the core material is dispersed in a water immiscible liquid and the other IFC reactant is dripped into this. In each of the examples, the core material is a non-aqueous core based on polyethylene glycol and the stabiliser is selected from polysiloxane polyalkylene oxide block polymers, block polymers of lauryl methacrylate and polyhydroxyethyl acrylate, together with a graft polymer of methyl methacrylate, cetyl methacrylate and an ethylene oxide adduct of hydroxyethyl methacrylate. These stabiliser systems will be somewhat similar to water-in-oil emulsifiers because of their very pronounced physically separate hydrophilic moieties (i.e., the hydrophilic block) and hydrophobic moieties (i.e., the hydrophobic block). These systems tend to give unsatisfactory results when used in the manner described in EP 671206.

Accordingly there remains a need for IFC products and processes which can be conducted in convenient manner using convenient and environmentally acceptable materials to give a satisfactory wall structure and a product of satisfactory and predetermined particle size.

According to the invention, we provide a particulate composition comprising particles having a hydrophilic core within a shell comprising a membrane comprising an association product of (a) an IFC condensation product formed by reaction between a first IFC reactant having at least two first condensation groups and a second IFC reactant having at least two second condensation groups, and (b) an amphipathic polymeric stabiliser which will concentrate at the interface between oil and water and which has recurring hydrophobic groups and recurring reactive hydrophilic groups which associate with the second condensation groups.

The association may comprise a condensation reaction between the reactive hydrophilic groups and the second condensation groups. For instance when, as is preferred, the reactive hydrophilic groups comprise carboxylic acid groups and the second condensation groups are amino, the association may involve the formation of an amide condensate linkage between the stabiliser and the IFC condensation product. This is thought to occur particularly when the stabiliser is a copolymer of an ethylenically unsaturated carboxylic anhydride, such as maleic anhydride.

However the association can be any other type of association that results in attraction between the stabiliser and the second reactant (and thus also the IFC condensation product). The association often comprises ionic association, for instance as a result of the formation of an ionic salt between carboxylic groups and groups which will form a salt with them. For instance the polymeric stabiliser may have carboxylic groups and a salt forming amine IFC reactant will then form a salt with them. It is then preferred that the amine should have been introduced in free base form, so as to minimise competition between the carboxylic groups and other acid moieties in the reaction mixture.

Best results seem to be achieved when the polymeric stabiliser is a copolymer of ethylenically unsaturated polycarboxylic acid (including dicarboxylic acid and the anhydrides) such as maleic acid or maleic anhydride, and the second reactant is a polyamine (including diamines, triamines and tetra amines) preferably having two to six carbon atoms between the amine groups. It appears that this configuration of adjacent carboxylic groups and diamine or higher groups is particularly conducive to the formation of strong association between the amine and the stabiliser, probably due to the formation of an internal, ring-formed, salt between the adjacent carboxylic groups and the diamine groups.

The invention also provides various processes for making particles having hydrophilic core within a shell formed by IFC polymerisation of a substantially oil soluble first IFC reactant having at least two first condensation groups with a substantially water soluble second IFC reactant having at least two second condensation groups. These processes all comprise forming a water-in-oil emulsion of an aqueous core composition comprising core material and a second reactant in a water immiscible liquid which contains an oil soluble or oil swellable polymeric stabiliser, blending the dispersion with the first IFC reactant and allowing reaction to occur between the first and second IFC reactants, thereby forming the shell.

In one preferred process, the polymeric stabiliser is an amphipathic polymeric stabiliser having recurring hydrophobic groups and recurring reactive hydrophilic groups and the reactive hydrophilic groups are associated (e.g., by condensation or by salt formation) with the second condensation groups of the second IFC reactant before the blending with the first IFC reactant.

In another preferred process the polymeric stabiliser has pendant carboxylic acid groups, the second IFC reactant is an amine, and the water in oil dispersion is homogenised before blending with the first IFC reactant. This homogenisation is beneficial because not only does it produce the desired particle size for the final particles but also it allows some form of association to occur between the carboxylic and amine groups. For instance the homogenisation is conducted by stirring for at least one minute, often three to ten minutes or more. The temperature can be ambient or elevated, for instance 40 to 80° C.

In another preferred process of the invention the polymeric stabiliser is a random copolymer formed by copolymerisation of a mixture of ethylenically unsaturated hydrophilic monomers and ethylenically unsaturated hydrophobic monomers.

In another process of the invention the blending of the dispersion with the first IFC reactant is conducted by mixing the dispersion and the first reactant under conditions wherein the weight ratio of the dispersion to the second reactant remains substantially constant through the blending process.

In particular, the process is preferably conducted by in-line blending of a feed containing the dispersion with a feed containing the first reactant, since by this means it is easily possible to control the ratio of dispersion to first reactant so as to maintain it substantially constant or at whatever other proportion is required.

In other preferred processes of the invention, the resultant dispersion of particles in water immiscible liquid is treated by adding a water miscible organic liquid (preferably a surfactant) to the dispersion and distilling off the water immiscible liquid, thereby forming a dispersion of the particles in the water miscible organic liquid. If desired, the dispersion in water immiscible liquid and/or water miscible liquid may be subjected to distillation so as to render it substantially anhydrous.

The processes of the invention, and especially those utilising a polymeric stabiliser that associates in some manner with the second reactant before the reaction between the first and second reactants, allow the production of more uniform particles at satisfactory concentrations and in particular it allows the production a substantially stable dispersion of small encapsulated particles (at least 90% by weight below 30 $\mu$m). They can beneficially influence the production of the IFC shell. For instance the amount of either or both of the reactants required to obtain a shell of defined properties can be reduced by optimising the polymeric stabiliser and its amount. Further the particles made using the stabiliser can be dispersed stably into another liquid (for instance a liquid detergent concentrate) more easily than if the polymeric stabiliser is not used.

The processes of the invention may comprise the subsequent step of distilling off most or all of the water from the aqueous core composition until the particles comprise a substantially anhydrous core encapsulated within the IFC polymer shell. The distillation is often referred to as azeotropic distillation as some of the organic liquid is usually distilled off with the water.

In another aspect of the invention, other articles comprising a membrane can be formed. Thus an interface can be formed between an aqueous phase and an oil phase, such as a flat interface to form a flat film or a tubular interface to form a tube, and the membrane which is formed at this interface can be an association product of the IFC condensation product and the amphipathic polymeric stabiliser. Although the invention can be applied to the production of films in this manner, for convenience all further description is in the context of the production of particles.

The invention can be applied to the production of relatively coarse particles, for instance at least 90% by weight above 50 $\mu$m and typically above 100 $\mu$m with generally 90% by weight being below 1000 $\mu$m and often below 500 $\mu$m. These beads can be separated from the dispersion as dry beads.

Preferably, the invention is applied to the production of finer particles, generally with at least 90% by weight of the particles having a dry size below 30 $\mu$m. The invention not only permits the production of a relatively high concentration (for instance 25 to 50% by weight of the final product) of such particles but it also permits the production of these particles in substantially individual form and substantially stably dispersed in the water immiscible liquid.

By referring to the dry size of the particles we mean the size of the particles measured after the dispersion has been distilled so as to provide a substantially anhydrous core, for instance having a total water content (based on the total weight of the particles) of below 20% and usually below 10% by weight. However if, in any particular process, it is not possible to dry the dispersion then the dry size can be estimated from measurement of the wet size of the particles coupled with an estimation of the extent to which the particles would shrink if they were dried.

By saying that the particles are substantially individually and stably dispersed in the water immiscible liquid we mean that the total number of particles (including agglomerated particles) above 30 $\mu$m is below 10% by weight and that preferably no settlement of particles occurs but if any does occur then the settled particles can very easily be redispersed by gentle stirring. Preferably the particles have a dry size at least 80% (and preferably at least 90%) by weight below 15 $\mu$m or 20 $\mu$m and so again the number of agglomerates having a size greater than 15 $\mu$m or 20 $\mu$m should be low. Preferably the dry size is at least 70% (and preferably 80% or 90%) by weight below 10 µm. The particles can be as small as, for instance, 50% below 1 µm but preferably at least 50% and most preferably at least 70% by weight and have a size in the range 1–5 µm.

Another way of defining the size is that the mean particle size (on a weight average basis) is preferably below 20 µm and most preferably below 10 µm often in the range of 1–5 µm.

The particles have to be made initially as a water-in-oil dispersion in a water immiscible liquid. This liquid is preferably free of halogenated hydrocarbons (such as chloroform) and is preferably a hydrocarbon.

The resultant dispersion, optionally after distillation to render the core substantially anhydrous, can be supplied to the user as such, for instance for incorporation into a detergent concentrate. Often, however, it is preferred to exchange the water-immiscible liquid in which the dispersion is formed for a different organic liquid which can be another water-immiscible liquid but is usually a surfactant or a water miscible liquid and may contain some water. However it is often convenient for the amount of water in this liquid to be kept relatively low, for instance below 20% weight, so that the final composition will then be a dispersion in a substantially non-aqueous liquid.

A suitable method of achieving this change in the liquid is by a method such as is described in Wo 94/25560. The method comprises forming the initial IFC dispersion in water-immiscible liquid, optionally dehydrating the dispersed particles by azeotropic distillation of the dispersion and adding to the dispersion a liquid selected from water-immiscible liquids and, preferably, surfactants and water-miscible liquids and which is less volatile than the initial water immiscible liquid, and distilling the initial water-immiscible liquid off from the dispersion until the amount of the initial water-immiscible liquid remaining in the dispersion is below 20% by weight of the liquid phase in the dispersion.

Although the dispersion is often dehydrated (before, during or after adding the surfactant or other liquid), removal of water is not essential since the water may often satisfactorily equilibrate with the continuous phase. This discovery is useful in the present invention but is also applicable to processes as described in WO 94/25560.

The added liquid may be a water-miscible and organic liquid, and it can be aqueous. For instance it may be a material such as a glycol, but preferably it is a surfactant, generally a non-ionic surfactant, with the result that the final product is a dispersion of the particles in the surfactant. The amount of the particles in the surfactant or other dispersion will normally be above 5% or 10% dry weight and usually will be above 20% or more. The dispersion may be fluid or meltable, i.e. the non-aqueous liquid may be a wax when cool and may have to be heated in order to provide a liquid state. Reference should be made to WO94/25560 for a full description of suitable materials and process conditions.

The invention therefore also provides a novel composition comprising a dispersion in an aqueous liquid (e.g., an aqueous surfactant) of particles having an aqueous core within a polymeric shell. This may be formed by any suitable IFC or other shell-forming method preferably by IFC using polymeric stabiliser as described herein.

The processes of the invention can yield dispersions in a substantially non-aqueous liquid or an aqueous liquid of particles having a dry size of at least 90% by weight below 30 µm wherein the particles are substantially individually and stably dispersed in the liquid (or wax) and wherein the particles have a core surrounded by a shell formed of a condensation polymer wherein the dispersion is stabilised by an oil-soluble or oil-swellable amphipathic polymeric stabiliser. When the liquid is a meltable wax, rather than a true liquid at room temperature, the dispersion will be a meltable solid at room temperature. The core can include a polymeric matrix and usually includes an active ingredient, such as an enzyme.

The compositions obtained in the invention can be used in any suitable manner. For instance, when the active ingredient is a detergent enzyme or other detergency material the dispersion in oil, surfactant or other liquid may be dispersed into a detergent liquid concentrate as described in application . . . filed even date herewith reference PRL03621WO and claiming priority from inter alia, GB 9526706.8 of Dec. 29, 1995.

When carrying out the initial manufacture of the particles having an aqueous core, an aqueous composition which is to provide the core material is dispersed into a water-immiscible non-aqueous liquid. A substantially water-soluble IFC reactant having low or no oil solubility is included in the dispersion. In some cases, certain components (eg some IFC reactant or a pH adjusting agent) to be incorporated in the shell or core of the particles may be introduced before, during or after encapsulation. If desired, the substantially water-soluble reactant is mixed into the aqueous core composition before that is dispersed in the water-immiscible liquid, but if desired the reactant and, optionally, other appropriate components (eg a pH adjusting agent such as sodium-hydroxide) can be mixed into a pre-formed dispersion of the aqueous composition in the water-immiscible liquid. In some instances, the IFC reactant can be water in the aqueous core composition. In some instances shell formation may be formed by two or more sequential reactions.

It is generally preferred that the water soluble reactant should have sufficient solubility in the oil phase that a small proportion of it will dissolve in the oil phase or that it will, at least, migrate to the interface between the oil and water phases. This promotes the desired association between the stabiliser and the substantially water soluble reactant.

The polymeric stabiliser should be included in the oil phase before IFC polymerisation occurs and in practice it is usually preferred for the stabiliser to be added to the water-immiscible liquid before dispersing the aqueous core composition into it, although if desired some or all of the stabiliser can be added with or after the aqueous core composition. Generally the stabiliser is supplied as a solution of swollen or dissolved stabiliser in an oil which becomes part of the total water-immiscible liquid.

If the oil-soluble IFC reactant is substantially unreactive under the conditions prevailing during the formation of the initial dispersion then the reactant can also be included in the water-immiscible liquid before or during the formation of the dispersion of aqueous core composition in the water-immiscible liquid. Usually it is preferred to form the aqueous dispersion of aqueous core composition and water-soluble IFC reactant in water-immiscible liquid which contains the amphipathic polymeric stabiliser, and then mix the oil-soluble IFC reactant into the dispersion. The oil soluble IFC reactant is usually not added until there has been adequate time (usually at least 2 minutes, e.g., 3 to 20 minutes) for association to occur between the stabiliser and the other IFC reactant. Generally homogenisation or other mixing is applied to promote association.

The formation of the dispersion will be conducted with whatever level of homogenisation is required in order to achieve the desired particle size. Thus if relatively coarse particles are required simple agitation may be sufficient but if a fine particle size is required then one or more passes through a Silverson or other homogeniser may be required.

Reaction between the water-soluble and oil-soluble IFC reactants is then allowed to occur. The oil soluble reactant has low or no solubility in water. Depending upon the combination of reactants, this may occur relatively spontaneously at the mixing temperature or, more usually, reaction is promoted by warming the entire dispersion, for instance to a temperature in the range of 30° C.–90° C. It may be desirable to warm or cool the dispersion to a suitable reaction temperature prior to adding the oil soluble reactant and/or to warm or cool the reactant (often dissolved in solvent) prior to addition to the dispersion. The oil-soluble reactant can be added in neat form but, in order to facilitate mixing of the oil soluble reactant into the pre-formed dispersion, the reactant is preferably added as a solution in an appropriate, e.g. organic, solvent. The solvent becomes part of the water-immiscible liquid phase of the dispersion.

It is generally desirable to stir the dispersion while the reaction occurs. Although the reaction may appear to be substantially complete quite quickly, for instance within five minutes from adding the oil-soluble IFC reactant, it is generally desirable to continue the stirring at the chosen reaction temperature for at least ten minutes up to an hour or more, typically around half an hour, to give maximum opportunity for full reaction to occur. Stirring may then be discontinued and the resultant composition either used as such or, more usually, subjected to dehydration and, preferably, solvent exchange by the general methods described above.

By referring to a water-soluble IFC reactant we mean a reactant which dissolves in the aqueous core composition (or water when this is the reactant). By referring to an oil-soluble IFC reactant and oil-soluble amphipathic polymeric stabiliser we mean a reactant or stabiliser which dissolves in the water-immiscible liquid. Accordingly the water-soluble IFC reactant will partition into the aqueous phase and the oil-soluble IFC reactant and the polymeric stabiliser will partition into the water-immiscible liquid with a significant partition coefficient, usually at least 5 and generally above 10. The polymeric stabiliser need not be truly soluble in the water-immiscible liquid (provided it is much less soluble in water) but may instead be in the form of a colloidal or other dispersion and so may be described as oil-swellable rather than oil-soluble.

The water-immiscible liquid can consist of a single non-aqueous liquid or can be a blend of two or more non-aqueous liquids. It should be water immiscible so as to minimise migration of the aqueous core composition and the water-soluble IFC reactant into the oil phase. It may be any environmentally acceptable water-immiscible liquid which has convenient volatility and other properties for the formation of the dispersion and for its eventual removal by distillation (if appropriate). Preferably it is a hydrocarbon, preferably a relatively low boiling and therefore volatile, aliphatic hydrocarbon. It is normally a paraffinic hydrocarbon.

The polymeric stabiliser is preferably amphipathic, by which we mean that it includes recurring hydrophilic and hydrophobic monomer units.

The polymer may be a condensation polymer, in which event it is normally a condensate of an oil soluble polymer with a water soluble polymer. The oil soluble polymer is often a polyester carboxylic acid and the water soluble polymer may be a polyethylene glycol or other polyhydroxy compound, for instance as described in GB-A-2,002,400 and thus the polymer may be a condensate of polyethylene glycol with hydroxy stearic acid. A preferred condensation polymer, which already contains some amino groups, is formed when the water soluble polymer is a polyamine, for instance as described in EP-A-333,501. Thus the condensation polymer may be a condensate of hydroxy stearic acid and polyethylene imine. Block copolymers for use in IFC processes are described in EP-A-671206 but are not as useful as ionic polymers, especially ionic random polymers.

Therefore it is generally preferred for the polymer to be a random copolymer of at least one ionic, and therefore hydrophilic, ethylenically unsaturated monomer with at least one water insoluble, non-ionic and therefore hydrophobic ethylenically unsaturated polymer. By referring to the polymer as random we merely mean that it is made by copolymerisation of a blend of the monomers.

The amphipathic polymeric stabiliser is preferably ionic. It can be amphoteric or cationic but preferably is anionic and thus us preferably a co-polymer of at least one anionic monomer with at least one water-insoluble non-ionic monomer. The molar amount of the ionic monomer is generally in the range 1 to 50% (often 10 to 30%) based on the total molar amount of ionic and water insoluble non-ionic monomers.

The use of dicarboxylic acid components in the stabiliser appears, as indicated above, to promote association between the stabiliser and the IFC condensate. In order to promote this association, the carboxylic groups are generally present in free acid form, so as to facilitate the formation of internal salts. However in other instances appropriate association, such as condensation, can be achieved when the carboxylic acid groups are present as short-chain alkyl esters of ethylenically unsaturated carboxylic acid groups, such as C1–4 low alkyl (meth) acrylate groups.

In general suitable stabilisers are addition copolymers containing both hydrophobic and hydrophilic moieties in such a ratio as to reside at the interface between the oil and water phase. The desired pendant groups are usually introduced by choice of monomers, but (less preferably) pendant groups in the final stabiliser can be provided by condensation or other reaction on to the stabiliser before it is used in the invention.

The water-insoluble non-ionic monomers should have a partition coefficient K between hexane and deionised water at 20° C. of at least 5 and preferably at least 10. Suitable hydrophobic monomers include higher alkyl esters of α, β-ethylenically unsaturated carboxylic acids such as dodecyl acrylate, dodecyl methacrylate, tridecyl acrylate, tridecyl methacrylate, tetradecyl methacrylate, octadecyl acrylate, Octadecyl methacrylate, ethyl half esters of maleic anhydride, diethyl maleate, and other alkyl esters derived from the reaction of alkanol having 4 to 20, preferably 8 to 20, carbon atoms, with ethylenically unsaturated carboxylic acid such as acrylic acid, methacrylic acid, fumaric acid, itaconic acid and acconitic acid. Other suitable hydrophobic monomers include styrene, alkyl styrenes such as methyl styrene, vinyl esters including vinyl acetate, vinyl halides, acrylonitrile, methacrylonitrile, ethylene, butylene, butadiene and other olefines and allyl ethers of non-ionic ethoxylated surfactants.

Suitable hydrophilic moieties include all water soluble ethylenically unsaturated monomers that undergo addition polymerisation, such as acrylic acid, methacrylic acid, acrylamide, 2-acrylamide-2-methyl propane sulphonic acid, itaconic acid, maleic acid, fumaric acid; ethylenically unsaturated quaternary compounds such as dimethyl amino ethyl acrylate or methacrylate quaternised with methyl chloride, diallyl dimethyl ammonium chloride vinyl or allyl sulphonates, vinyl or allyl amines, hydroxy lower-alkyl esters of ethylenically unsaturated acids, and other alkylaminoalkyl—(meth) acrylates and—(meth) acrylamides.

It is particularly desirable to use a polycarboxylic acid, especially a di-carboxylic acid such as maleic acid (utilised either as the acid or the anhydride) or itaconic acid as part or all of the acid component (for instance at least 20% by weight of the acid, often at least 50%).

Other ethylenically unsaturated comonomers may also be included, so as to modify the solubility parameters of the stabilisers to promote precipitation and residence at the interface between the oil and water phase.

Suitable monomers are short chain alkyl esters of ethylenically unsaturated carboxylic acids such as acrylic acid, methacrylic acid, fumaric acid, itaconic acid and aconitic acid, where the alkyl group generally contains between 1 and 4 carbon atoms e.g. methyl acrylate or methacrylate, butyl acrylate or methacrylate.

Ratios of hydrophobic to hydrophilic monomer can be between 90 parts by weight of hydrophobic monomer and 10 parts by weight of hydrophilic monomer to 20 parts by weight of hydrophobic monomer and 80 parts by weight of hydrophilic monomer.

When the short chain esters are incorporated they replace the hydrophobic monomer in the copolymer, and the dry weight ratio of short chain ester will not exceed 50 parts. Minor amounts of other non-interfering monomers can be included such as difunctional or other polyfunctional monomers.

The optimum monomer blend, and thus the optimum stabiliser in any particular process, will depend inter alia on the choice of water immiscible liquid and the core material and the IFC reactants and the proportions of each of these.

The stabiliser usually has a molecular weight (measured by gel permeation chromatography of above 2000 and preferably above 10,000 up to, for instance 100,000 or 200,000.

The selection of a suitable blend and molecular weight can be done by performing the IFC polymerisation in a water-in-oil emulsion and subjecting the product to microscopic examination. Additionally, a simple test to facilitate selection of aqueous and oil phases is as follows.

The aqueous phase containing the water soluble IFC reactant is spread as a layer in a vessel. The oil phase is spread over it with minimum intermixing at the chosen reaction temperature, the oil phase containing the chosen amount of IFC reactant. It will be found that the quality of the film which is formed at the interface varies according to the content of the two phases, for instance any polymeric stabiliser and its amount. Once a combination of phases has been found that can give both a satisfactory water-in-oil dispersion and a film in the test described above, it is predictable that reasonable wall formation will occur. Combinations of materials for use in the second aspect of the invention can be selected in this manner.

The test is preferably used to optimise the stabiliser. Accordingly once a monomer concentration and stabiliser concentration has been found which gives a reasonable film, the stabiliser and its amount can be varied in successive tests and the effect on film quality observed.

When the stabiliser is replaced by, or supplemented by a significant amount of a conventional non-polymeric water-in-oil emulsifier then film quality may deteriorate significantly and a coherent film may not be obtained. The reason for this is not clear but it seems that the emulsifier may promote emulsification of the phases and promote precipitation polymerisation-within the oil phase due to hydrophilic micelle formation within the oil phase, whereas the stabiliser may promote emulsification of the phases and concentration of the polymerisation at the interface.

The polymerisation is preferably conducted in the substantial absence (e.g., below 3%, preferably below 1% and preferably zero or near zero) of non-polymeric water-in-oil emulsifier or any other material which interfere with satisfactory performance of the process.

The IFC reactants are chosen so as to give the desired condensate polymer. It is particularly preferred for the condensate to be a polyamide but other condensates which can be formed in the invention are polyesters, polyurethanes, polyureas and epoxies. The use of polyamide is particularly useful in capsules for detergents. When the condensate is a polyamide, it is best obtained by reaction of a diamine (or higher amine) with a dicarboxylic acid (or higher carboxylic acid) usually as a derivative such as the acid halide or anhydride. The amine is preferably the substantially water soluble IFC reactant and can be one or various aliphatic polyamines such as ethylene diamine, hexamethylene diamine, hexane diamine, diethylene tetramine, ethylene tetramine, diamino benzene, piperazine, tetramethylene pentamine or, preferably, diethylene triamine.

The acid component is preferably the oil soluble IFC reactant and can be in the form of an acid halide. It can be, for instance, adipyl, sebacyl or phthalyl chloride or dodecanedioc acid chloride but is preferably terephthaloyl chloride.

It should be noted that the water soluble reactant can have some solubility in the oil phase such that it can react with the oil soluble amphipathic polymeric stabiliser in the oil phase. For instance the free base amines are preferred and will generally have some solubility in the oil phase.

When the condensate polymer is a polyester it can be formed by reaction between, for instance, any of the acids or acid derivatives mentioned above as the oil soluble IFC together with a water soluble polyol such as ethylene glycol, butane diol, polycaprolactone diol or Bisphenol A.

When the condensate polymer is a polyurethane it can be formed by reaction between a suitable hydroxy or amine compound selected from any those discussed above as the water soluble IFC reactant and an oil soluble isocyanate reactant such as toluene di-isocyanate or other suitable material such a hexamethylenebis chloroformate.

Another type of polyurethane can be obtained by using an oil-soluble oligomeric isocyanate. This reacts with water at the interface to produce amino groups which react with isocyanate groups in the oil phase to form an IFC film at the interface.

When the condensate polymer is an epoxy, it can be made by reaction between, for instance, ethylene diamine or other water soluble amine or hydroxy compound with an epoxy resin as the oil soluble IFC reactant.

The process of the invention preferably comprises forming a water-in-oil dispersion of the aqueous core phase in water immiscible liquid containing the polymer as a stabiliser and which is free of the first condensation groups, reacting the polymer with non-polymeric first reactant which has sufficient solubility in the water immiscible liquid to react with the polymer, and then dispersing the second, oil soluble, IFC reactant into the dispersion and allowing condensation to occur. The reaction may occur relatively spontaneously at the mixing temperature or, more usually, reaction is promoted by warming the entire dispersion, for instance to a temperature in the range of 30° C.–90° C. It may be desirable to warm or cool the dispersion to a suitable reaction temperature prior to adding the oil soluble reactant and/or to warm or cool the reactant (often dissolved in solvent) prior to addition to the dispersion. The oil-soluble reactant can be added in neat form but, in order to facilitate mixing of the oil soluble reactant into the pre-formed dispersion, the reactant is preferably added as a solution in an appropriate, e.g. organic, solvent. The solvent becomes part of the water-immiscible liquid phase of the dispersion.

It is generally desirable to stir the dispersion while the reaction occurs. Although the reaction may appear to be substantially complete quite quickly, for instance within five minutes from adding the oil-soluble, second, IFC reactant, it is generally desirable to continue the stirring at the chosen reaction temperature for at least ten minutes up to an hour or more, typically around half an hour, to give maximum opportunity for full reaction to occur. Stirring may then be discontinued and the resultant composition either used as such or, more usually, subjected to dehydration and, preferably, solvent exchange by the general methods described above.

Although the process can be conducted by adding the second reactant to the dispersion, preferably the process is conducted by mixing the dispersion and the second reactant under conditions such that the weight ratio of dispersion to second reactant is substantially constant throughout the mixing process, for instance so that it does not vary by more than a factor of about 1.5 or 2 during the process. Preferably the process is conducted by in-line mixing of two feeds, one containing the dispersion and the other containing the second reactant. By this means, the ratio of second reactant to first reactant can be maintained substantially constant throughout the process and therefore the degree of reaction between the second reactant and the first condensation groups in the dispersion can be maintained more uniform.

The material which is to form the core of the capsules is usually hydrophilic and is usually introduced into the process as an aqueous composition. It can consist solely of an aqueous solution or dispersion of an active ingredient which is to be trapped within the capsules. For instance the core material may include any active ingredient which will partition preferentially into the aqueous phase in the process. The active ingredient should preferably have a high molecular weight inorder to minimise the risk of migration through the shell. For instance it may be in the form of a crystal or complex of large molecular size. The active ingredient can be, for instance, an agriculturally useful active ingredient such as an herbicide or pesticide, a pharmaceutically useful active ingredient, a fragrance, or a biologically active material such as an enzyme. Other suitable active ingredients include optical brighteners, photo bleaches, proteins, a substrate for an enzyme or an enzyme stabiliser. Combinations of such ingredients, e.g. an enzyme and a stabiliser therefor, may be appropriate.

Inks (including various dye or pigment compositions) and chemically reactive materials which need to be kept isolated from other materials prior to rupture or other release mechanism may be used as the active ingredient.

Preferred active ingredients include enzymes. An enzyme may be introduced, for example, in the form of a purified enzyme or an extract (such as a fermentation broth) containign cell debris and/or other by-products from the initial production of the enzyme. Very suitable enzymes include enzymes of types which may be usefully included in a deteregent, as well as enzymes of types employed in industrial processes (e.g., in the starch-processing industry, in textile treatment or in the protein industry).

Enzymes of relevance in the context of the present invention include, but are by no means limited to, the following [enzyme classification numbers (EC numbers) referred to herein being in accordance with the Recommendations (1992) of the Nomenclature Committee of the International Union of Biochemistry and Molecular Biology, Academic Press Inc., 1992].

Proteases (i.e., peptidases, EC 3.4), such as proteases obtainable from animals, plants or—in particular—microorganisms (notably bacterial or fungi), as well as mutants of such proteases produced by chemical modification or genetic engineering. Suitable commercially available proteases include Alcalase™, Savinase™, Everlase™, Durazym™, Esperase™ and Flavourzyme™ (all available from Novo Nordisk A/S, Denmark) Maxatase™, Maxacal™, Maxapem™ and Properase™ (available from Gist-Brocades), Purafect™ and Purafect™ OXP (available from Genencor International), as well as Opticlean™ and Optimase™ (available from Solvay Enzymes).

Lipases (e.g., triacylglycerol lipases, EC 3.1.1.3), such as lipases obtainable from animals (e.g., mammals), plants or—in particular—microorganisms (notably bacteria or fungi), as well as mutants of such lipases produced by chemical modification or genetic engineering. Lipases of types referred to in the literature as "cutinases" (such those obtainable from *Pseudomonas mendocina* as described in WO88/09367, or from *Fusarium solani* f. pisi as described, e.g., in WO90/09446) are included in this connection. Suitable commercially available lipases include Lipolase™ and Lipolase Ultra™ (available from Novo Nordisk A/S, Denmark), Lipomax™, Lumafast™ and M1 Lipase™ (available from Genencor International), and Lipase P "Amano" (available from Amano Pharmaceutical Co.Ltd.).

Amylases [e.g., a-amylases, EC 3.2.1.1, β-amylases, EC 3.2.1.2, and amyloglucosidases (glucoamylases), EC 3.2.1.3], such as amylases obtainable from microorganisms (notably bacteria or fungi), as well as mutants of such amylases produced by chemical modification or genetic engineering. Suitable commercially available amylases include Termamyl™, BAN™, Duramyl™, Fungamyl™ and AMG™ (all available from Novo Nordisk A/S, Denmark), as well as Rapidase™ and Maxamyl™ (available from Genencor International).

Cellulases (e.g., endo-1,4-β-glucanases, EC 3.2.1.4), such as cellulases obtainable from microorganisms (notably bacteria or fungi), as well as mutants of such cellulases produced by chemical modificatin or genetic engineering. Suitable commercially available cellulases include Celluzyme™, Celluclast™, Cellusoft™ and Denimax™ (all available from Novo Nordisk A/S, Denmark), and KAC-500(B)™ available from Kao Corporation).

Oxidoreductases [EC 1; including phenol-oxidases such as laccases (EC 1.10.3.2) and other enzymes classified under EC 1.10.3; and peroxidases (EC 1.11.1), notably those classified under EC 1.11.1.7], such as oxidoreductases obtainable from plants or microorganisms (notably bacteria or fungi), as well as mutants of such oxidoreductases produced by chemical modification or genetic engineering. Suitable laccases include those obtainable from fungal species within genera such as Aspergillus, Neurospora, Podospora, Botrytis, Collybia, Fomes, Lentinus, Pleurotus, Trametes, Polyporus, Rhizoctonia, Coprinus, Psatyrella, Myceliophthora, Schytalidium, Phlebia, Coriolus, Pyricularia or Rigidoporus, such as laccase obtainable from *Trametes villosa* (also previously known, inter alia, as *Polyporus pinsitus*) or from *Myceliophthora thermophila*. Suitable peroxidases include plant-derived peroxidases, such as horseradish peroxidase or soy bean peroxidase, as well as peroxidases obtainable from fungal species within genera such as Fusarium, Humicola, Trichoderma, Myrothecium, Verticillium, Arthromyces, Caldariomyces, Ulocladium, Embellizopus or Mucor, or from bacterial species within genera such as Streptomyces, Streptoverticillium, Bacillus, Rhodobacter, Rhodomonas, Streptococcus, Pseudomonas or Myxococcus. Other sources of potentially useful peroxidases are listed in B. C. Saunders et al, Peroxidase, London 1964, pp. 41–43. Particularly useful peroxidases include those obtainable from Coprinus species such as *C. cinereus* or *C. macrorhizus* (as described, e.g., in WO92/16634).

Other relevant types of enzymes within the context of the invention include xylose isomerases (EC 5.3.1.5) useful, e.g., in the conversion of D-glucose to D-fructose (e.g., in the manufacture of fructose syrups in the starch-processing industry).

As mentioned above, a stabiliser for the enzyme may be included in the core.

The aqueous core composition preferably also includes an aqueous solution or emulsion of polymeric or polymerisable material which can form a polymer matrix. The active ingredient is preferably distributed substantially uniformly throughout the aqueous composition as a dispersion or solution, but may be distributed non-uniformly.

The polymer may be introduced as an emulsion of water insoluble polymer or it may be introduced in the form of a soluble derivative which is insolubilised during subsequent dehydration, for instance as described in EP 356239 or WO 92/20771 or GB 9526668.0. It can be a copolymer of a hydrophobic monomer with a free acid or free base form of an ionic monomer which is introduced as a water soluble salt. For instance it may be a copolymer with a free base amino monomer introduced as a salt with acetic acid or other salt, which is then volatilised to give an insoluble copolymer. Alternatively it may be introduced as a water soluble polymer and remain water soluble throughout any subsequent drying procedure. Polymerisation or cross linking may occur, for instance during subsequent drying, using any suitable polymerisation or cross linking reaction mechanism.

Potentially soluble polymers that can be included in this manner include materials such a polyvinyl pyrrolidone, polyacrylic acid (generally as sodium or other salt) polyacrylamide or a calcium-independent suphonate polymer. Natural or modified natural polymers such as gums or carbohydrates can be used.

The polymer is preferably a polymer which will cause release of the active ingredient by co-operating with water which migrates by osmosis through the shell from wash water to expand and stretch the shell, as described in our application Ser. No. 08/875,052 now U.S. Pat. No. 6,242,405, filed even date herewith claiming priority from GB 9526706.8 filed Dec. 29, 1995.

The proportions of the IFC reactants, and the total weight of the polymer shell, can be selected according to the desired properties of the shell. Generally the shell provides from 2%–50%, often around 10%–30% by weight of the total dry weight of the encapsulated material (i.e. shell and dehydrated core) but not usually more than about 50% or 60%. The molar proportions of the water soluble and oil soluble IFC reactants are generally in the range 10:1 to 1:10. For instance the molar ratio of water-soluble reactant: oil-soluble reactant may be from 10:1 to 1:3, often from 5:1 to 1:1.

The amount of polymeric stabiliser is generally in the range 0.1 to 10% usually around 0.5%–3%, by weight stabiliser based on the total weight of the dispersion in which the particles are formed. The amount based on the dry weight of the particles is generally in the range 0.5 to 30%, often around 3%–10% by weight.

The amount of aqueous core composition and water soluble IFC reactant is usually at least 5 or 10% by weight, preferably at least 25% by weight of the aqueous dispersion but it is usually not more than 60% or 70%.

The dry weight of the core in the aqueous dispersion is usually at least 2% or 5% by weight and preferably at least 10%. Often it is not above 40% or 50% by weight.

The particles can be caused to release active ingredient from their core into any desired location by release techniques such as physical rupture by compression or otherwise, or by expansion of swellable material within the core to stretch or rupture the shell so as to allow permeation through the shell.

Preferably the capsules are utilised for encapsulating enzyme which is released by osmotic pressures, the capsules being incorporated in a liquid detergent concentrate as described in our application Ser. No. 08/875,052 claiming priority from GB 9526706.8 of Dec. 29, 1995.

The novel products of the invention, and the products of the novel processes of the invention, all have the advantage of providing IFC wall formation which is more uniform and less prone to premature release of core material than when known processes are used for making the capsules. In particular the IFC polymer is usually deposited almost exclusively on the interface around each droplet, often in ionic or covalent association with polymeric stabiliser at the interface.

The following are examples of the invention. All parts are by weight.

In the context of this invention proteolytic activity is expressed in Kilo NOVO Protease Units (KNPU). The activity is determined relatively to an enzyme standard (SAVINASE™) and the determination is based on the digestion of a dimethyl casein (DMC) solution by the proteolytic enzyme at standard conditions, i.e., 50° C., pH 8.3, 9 min. reaction time, 3 min. measuring time. A brochure (AF 220/1) providing further details is available upon request from Novo Nordisk A/S, Denmark.

EXAMPLE 1

Savinase aqueous preparation supplied by Novo Nordisk A/S having proteolytic activity of 44 KNPU/g (777 g) is mixed with 45% polyvinyl pyrrolidone K60 solution (190 g) and 32.4 g of diethylene triamine (DETA) added to this mixture.

An oil phase is prepared by mixing 221 g of 21% amphipathic emulsion stabiliser with 208 g of a volatile hydrocarbon solvent.

The aqueous enzyme mixture containing the DETA is added to the above oil phase and homogenised with a high shear Silverson mixer to form a water-in-oil emulsion having a mean droplet size of about 3 μm. The temperature of the emulsion is kept below 40° C. during this step. After formation of the emulsion, an extra 571 g of the volatile solvent is added to dilute the W/O emulsion.

The resulting emulsion is placed under mechanical stirring and warmed to 37° C. An oil-monomer phase is prepared by dissolving 34 g of terephthaloyl chloride (TPC) in 966 g of the volatile solvent. This oil-monomer phase is added to the warm emulsion over 5 minutes to initiate the wall forming reaction. A polyamide membrane forms around the fine aqueous enzyme droplets. The reaction mixture is left stirring for 30 minutes to complete the interfacial polymerisation.

The resultant suspension has a dispersed phase which accounted for about 33% of the total weight of the suspension.

This suspension is then dehydrated by distillation and subjected to a solvent exchange process with non-ionic surfactant substantially as described in Example 1 of WO 94/25560 to provide a substantially stable dispersion in non-ionic surfactant of particles having a mean size of about 3 μm. The suspension has approximately 40 KNPU/g proteolytic activity.

In this process, shell formation is satisfactory, and a stable monoparticulate dispersion is formed both initially and after the solvent exchange and when added to detergent concentrate, when the stabiliser is any of the following copolymers.

A styrene/octadecyl methacrylate/methacrylic acid copolymer in the weight ratio of 30/30/40.

Octadecyl methacrylate/methacrylic acid 66/34.

Octadecyl methacrylate/methyl methacrylate/acrylic acid 50/25/25.

Octadecyl methacrylate/methacrylic acid 64/36.

Octadecyl methacrylate/methyl methacrylate/acrylic acid/methacrylic acid 40/50/5/5.

Acrylonitrile/lauryl acrylate/acrylic acid 25/35/40.

Lauryl methacrylate/styrene/acrylic acid 40/50/10.

Styrene/docosaryl acrylate/methacrylic acid 55/35/10.

Octadecyl methacrylate/vinyl acetate/methyl methacrylate/methacrylic acid 35/10/45/10.

When the process is repeated using a non-ionic block co-polymer available under the Trade Name Hypermer 246 the process was not as satisfactory.

EXAMPLE 2
(Comparative)

An aqueous phase is prepared consisting of Savinase Concentrate (aqueous protease 36 KNPU/g activity polyvinylpyrrolidone aqueous solution (K60, 80 parts), diethylenetriamine (13 parts) glacial acetic acid (15 parts) and water (22 parts).

This aqueous phase at pH7 is added with high shear mixing to an oil phase consisting of emulsifier (Span 85; 10 parts) dissolved in a volatile hydrocarbon solvent (280 parts). The resulting 1.85:1 water-in-oil emulsion is diluted with more volatile hydrocarbon solvent (240 parts) to 1.0:1.0 W:0.

The pH of the aqueous phase is increased by addition of concentrated sodium hydroxide solution (46%: 10 parts) and milling continued at less than 40° C. for 2 minutes. This alkaline emulsion is stirred at 20° C. whilst a solution of the oil phase reactant (terephthaloyl chloride; 13 parts) in volatile hydrocarbon solvent (490 parts) is added over 15 minutes.

At the end of this reaction period the mixture no longer appears as a smooth water-in-oil emulsion but appears grainy. Under the microscope droplets of dispersed phase can easily be seen, but there is no apparent wall only gelled polymer attached to the surface showing very poor capsule formation.

EXAMPLE 3
Preparation of DETA-substituted Stabiliser

A solution of an amphipathic polymeric O/W stabiliser (I) (10 parts) in a hydrocarbon solvent (90 parts) is treated with a single addition of di-ethylene tri-amine (DETA; 10 parts) at room temperature for 5 min with vigorous agitation. After this time, some association has occurred between the amphipathic polymer and excess DETA (mixture II).

The amphiphatic polymer can be selected from

Octadecyl methacrylate/methyl methacrylate/acrylic acid 50/25/25.

Octadecyl methacrylate/methyl methacrylate/acrylic acid/methacrylic acid 40/50/5/5.

Octadecyl methacrylate/vinyl acetate/methyl methacrylate/methacrylic acid 35/10/45/10.

EXAMPLE 4
Preparation of W/O Microcapsules with the DETA-substituted Stabiliser as Co-reactant An aqueous solution of the active ingredient (110 parts) is milled into mixture II from Example I (110 parts) to give a W/O emulsion (III) having a mean aqueous droplet size of about 10 micron. Homogenisation is conducted for about 5 minutes.

Separately, a solution is prepared of terephthalic chloride (10 parts) in a hydrocarbon solvent (200 parts). This solution is added to the W/O emulsion described above with agitation over a period of 5 minutes at 25° C. After this time inspection under a visible microscope clearly showed the presence of discrete capsules, free of aggregates and clumps. The mean particle size corresponded to the mean particle size of the intermediate W/O emulsion (III).

EXAMPLE 5

The process described in Example 4 was repeated except that the W/O emulsion (III) is contacted with the terephthalic chloride solution by means of an in-line static mixer. This mixing of the two phases continued over a period of 15 minutes although the agitation in the in-line mixer only occurred for a few seconds. The effluent from the mixer was allowed to collect in a receiving vessel without further mechanic agitation.

Capsules made in this way were identical in all respects to those from Example 4 except that experiments to show the strength of the membrane films implied that the in-line mixing method leads an average to a stronger membrane than the batch mixing method.

EXAMPLE 6

This example shows two different ways of encapsulating the enzyme wherein the enzyme is precipitated in version B before encapsulation, but not in version A.

Capsules were formed from the following ingredients, in which all amounts are specified in grams. The polymer is a copolymer of 75% by weight acrylamide and 25% acrylic acid, in the form of sodium salt of medium (for instance 150,000) molecular weight. Deta is diethylene triamine. The stabiliser is copolymer of styrene, stearyl methacrylate and acrylic acid. Isopar is a trade name for a volatile hydrocarbon. TPC is terephthalyl chloride.

|  | A | B |
|---|---|---|
| 16.1% Enzyme concentrate | 63.38 | 45.06 |
| Borax | 0.63 | 0.45 |
| 29% Polymer | 9.96 | 7.08 |
| 25% Na2SO4 | 0.00 | 21.63 |
| DETA | 1.03 | 0.78 |

-continued

|  | A | B |
|---|---|---|
| Stabiliser | 6.10 | 4.34 |
| Isopar (Batch 1) | 34.28 | 36.05 |
| Isopar (Batch 2) | 34.62 | 34.62 |
| 3% TPC in Isopar | 43.19 | 32.52 |
| Activity, KNPU | 11.8 | 8.9 |

The capsules are made by dissolving the stabiliser in the first batch of Isopar and then emulsifying the deta into this Isopar with the application of homogenisation for minutes using a Silverson (trade name) homogeniser at full speed with cooling in an ice bath for 2 minutes.

Separately, the enzyme concentrate, borax, polymer and sodium sulphate (if present), had been prepared as an aqueous enzyme phase. In process A, the solution appeared clear but in process B it appeared cloudy, as a result of precipitation of the enzyme.

The aqueous enzyme phase is slowly added to the oil phase containing deta, stabiliser and Isopar, the addition being conducted with emulsification using the Silverson for 10 minutes. The second batch of Isopar is then added, with emulsification using the Silverson being conducted for a further 2 minutes and with the water in oil emulsion being thermally equilibrated to 20° C. in a water bath.

Accordingly, in this process, the deta has been subjected to emulsification in the presence of a stabiliser for at least 14 minutes.

The solution of TPC is heated to 50° C. and is added quickly with vigorous stirring. The product is stirred for at least 30 minutes while being held at a temperature of 20° C. A suspension of the capsules in Isopar is obtained.

If desired a non-ionic surfactant (Dobanol 25-7) can be added and the Isopar then distilled off to produce a dispersion in the surfactant. Alternatively the dispersion in Isopar can be used.

The enzymatic storage stability of encapsulated protease A and B, and liquid lipase in presence of the protease capsules has been determined in a commercially available US liquid detergent (WISK Free Clear), where pH was adjusted to 10.1.

Formulations:

I: 2% Savinase 4.8 L, 1% Lipolase 100 L, 97% US liquid detergent
II: 1% savinase capsules A, 1% Lipolase 100 L, 98% US liquid detergent
III: 1% Savinase capsules B, 1% Lipolase 100 L, 98% US liquid detergent
IV: 1% Lipolase 100 L, 99% US liquid detergent.

Formulations I to IV were left at 30° C. for 0, 4 and 8 days, and the residual protease and lipase activities were measured: Savinase stability, % residual activity:

|  | days | | |
|---|---|---|---|
| Formulation | 0 | 4 | 8 |
| I | 100 | 87.2 | 79.1 |
| II | 100 | 82.9 | 67.6 |
| III | 100 | 97.4 | 91.4 |

The storage stability of protease capsules A, formulation II (without sulfate) is poorer than that of liquid protease (due to the increased concentration of active protease inside the capsules). Precipitating the protease with sulfate (capsules B, formulation III) significantly improves the storage stability compared to both capsules A and liquid protease. Lipolase stability, % residual activity:

|  | days | | |
|---|---|---|---|
| Formulation | 0 | 4 | 8 |
| I | 100 | 8.9 | — |
| II | 100 | 70.2 | 46.1 |
| III | 100 | 92.6 | 89.1 |
| IV | 100 | 92.3 | 90.2 |

The storage stability of lipase is significantly improved when precipitating the protease with sulfate. However, compared to other systems, the storage stability of the non-precipitated composition (A) was also satisfactory.

Improved results are obtained when the polymer is replaced by the use of sodium polyacrylate homopolymer of similar molecular weight and, especially, when the stabiliser is replaced by a copolymer of styrene, stearyl methacrylate and maleic anhydride.

EXAMPLE 7

This example shows the production of immobilised enzyme, and in particular immobilised amyloglucosidase (AMG). The resultant particles are useful as encapsulated enzyme for industrial use since they allow the reactants and the products from the reaction to diffuse through the wall of the capsules but do not allow the enzyme itself to diffuse out.

4.37 grams deta is emulsified into 10.4 grams of a 30% solution of a polymeric stabiliser (as in the preceding example) and 114 grams Isopar using a Silverson homogeniser at full speed for 2 minutes with cooling on an ice bath. 120 grams of an 18.4% enzyme concentrate (188 AGU/g) is slowly added with further emulsification for 10 minutes. 187 grams of 3% solution in Isopar of terephthalyl chloride at 50° C. is then quickly added and emulsification is continued for 5 minutes. The emulsion is left stirring at 20° C. for 30 minutes. 170 grams Dobanol 25-7 is then added and the water and Isopar are distilled off under vacuum (up to 95° C. at 20 mbar).

In order to test the performance of the products, the following buffers and sample preparations and tests were conducted.

Buffers:
Buffer A: 0.1 M Acetate, pH 4.3
Buffer B: 0.1 M Borax, pH not adjusted
Substrate: 0.1% p-Nitrophenyl-alpha-D-glucopyranoside (NBS Biologicals) in Buffer A
Sample Preparation:
I) 0.774 g AMG capsules+1.624 g Dobanol 25-7+47.61 g Buffer
II) 0.271 g AMG concentrate+1.968 g Dobanol 25-7+47.78 g Buffer A
III) 1.507 g Dobanol 25.7+48.52 g Buffer A
The samples (with an enzyme activity of 1.0 AGU/g) were vigorously stirred for one hour.

The following samples were prepared:
IV) 2 ml I+4 ml Substrate
V) 2 ml I filtrate through a 0.45 micron filter* (Millipore)+4 ml Substrate
*Filtration through a 0.45 micron filter removes all capsules.
VI) 2 ml II+4 ml Substrate
Blind) 2 ml III+4 ml Substrate.

Samples IV to VI and Blind were left stirring at 25° C. for one hour, 6 ml buffer B was added and the samples were left stirring for approximately five minutes and filtered through a 0.2 micron filter. The absorbance at 400 nm was measured.

The reaction between the substrate and the enzyme produced glucose and p-nitrophenol gives a yellow liquid under alkaline conditions, which is obtained with Buffer B. The produced colour is proportional to the AMG concentration. The colis is measured with a spectrophotometer at 400 nm (OD400).

| Sample | Absorbence at 400 nm |
|---|---|
| IV: | 0.644 |
| V: | 0.011 |
| VI: | 0.762 |
| Blind: | 0.005 |

The leakage of enzyme from the capsules (sample V) is approximately:

$$100 \cdot (0.011-0.005)/(0.762-0.005) \sim 1\%$$

The efficiency of the encapsulated enzyme (sample IV) on the substrate is approximately:

$$100 \cdot (0.644-0.005)/(0.762-0.005) \sim 84\%$$

The capsules is thus only leaking very small amounts of the enzyme, but the enzyme is nearly as efficient on the substrate as not encapsulated enzyme.

What is claimed is:

1. A process for making particles having a hydrophilic core within a shell formed by interfacial condensation polymerisation of a substantially oil soluble first IFC reactant having at least two first condensation groups with a substantially water soluble second IFC reactant having at least two second condensation groups, the process comprising forming a water in oil dispersion of an aqueous core composition comprising core material and the second IFC reactant in a water immiscible liquid which contains an oil soluble or oil swellable polymeric stabiliser, blending the dispersion with the first IFC reactant and allowing reaction to occur between the first and second IFC reactants and thereby forming the shell, and in which the polymeric stabiliser is an amphipathic polymeric stabiliser having recurring hydrophobic groups and recurring reactive hydrophilic groups and the reactive hydrophilic groups are associated with the second condensation groups of the second IFC reactant before the blending with the first IFC reactant.

2. A process for making particles having a hydrophilic core within a shell formed by interfacial condensation polymerisation of a substantially oil soluble first IFC reactant having at least two first condensation groups with a substantially water soluble second IFC reactant having at least two second condensation groups, the process comprising forming a water in oil dispersion of an aqueous core composition comprising core material and the second IFC reactant in a water immiscible liquid which contains an oil soluble or oil swellable polymeric stabiliser, blending the dispersion with the first IFC reactant and allowing reaction to occur between the first and second IFC reactants and thereby forming the shell, and in which the polymeric stabiliser has pendant carboxylic groups, the second IFC reactant is an amine, and the water in oil dispersion is homogenised before blending with the first IFC reactant.

3. A process for making particles having a hydrophilic core within a shell formed by interfacial condensation polymerisation of a substantially oil soluble first IFC reactant having at least two first condensation groups with a substantially water soluble second IFC reactant having at least two second condensation groups, the process comprising forming a water in oil dispersion of an aqueous core composition comprising core material and the second IFC reactant in a water immiscible liquid which contains an oil soluble or oil swellable polymeric stabiliser, blending the dispersion with the first IFC reactant and allowing reaction to occur between the first and second IFC reactants and thereby forming the shell, and in which the polymeric stabiliser is a random copolymer formed by copolymerising a mixture of ethylenically unsaturated hydrophilic and ethylenically unsaturated hydrophobic monomers.

4. A process for making particles having a hydrophilic core within a shell formed by interfacial condensation polymerisation of a substantially oil soluble first IFC reactant having at least two first condensation groups with a substantially water soluble second IFC reactant having at least two second condensation groups, the process comprising forming a water in oil dispersion of an aqueous core composition comprising core material and the second IFC reactant in a water immiscible liquid which contains an oil soluble or oil swellable polymeric stabiliser, blending the dispersion with the first IFC reactant and allowing reaction to occur between the first and second IFC reactants and thereby forming the shell, and in which the blending is conducted by mixing the dispersion and the first reactant under conditions wherein the weight ratio of dispersion to first reactant remains substantially constant through the blending process.

5. A process for making particles having a hydrophilic core within a shell formed by interfacial condensation polymerisation of a substantially oil soluble first IFC reactant having at least two first condensation groups with a substantially water soluble second IFC reactant having at least two second condensation groups, the process comprising forming a water in oil dispersion of an aqueous core composition comprising core material and the second IFC reactant in a water immiscible liquid which contains an oil soluble or oil swellable polymeric stabiliser, blending the dispersion with the first IFC reactant and allowing reaction to occur between the first and second IFC reactants and thereby forming the shell, and in which the blending is conducted by in-line blending of a feed containing the dispersion and a feed containing the first reactant.

6. A process for making particles having a hydrophilic core within a shell formed by interfacial condensation polymerisation of a substantially oil soluble first IFC reactant having at least two first condensation groups with a substantially water soluble second IFC reactant having at least two second condensation groups, the process comprising forming a water in oil dispersion of an aqueous core composition comprising core material and the second IFC reactant in a water immiscible liquid which contains an oil soluble or oil swellable polymeric stabiliser, blending the dispersion with the first IFC reactant and allowing reaction to occur between the first and second IFC reactants and thereby forming the shell, and then adding a water miscible organic liquid (preferably a surfactant) and distilling off the water immiscible liquid (and optionally distilling off water from the core), and thereby forming a dispersion of the particles in the water miscible organic liquid.

7. A process according to claim 1 conducted to produce a particulate composition comprising particles having a hydrophilic core within a shell comprising a membrane comprising as association product of (a) an interfacial condensation product formed by reaction between a first IFC reactant having at least two first condensation groups and a second IFC reactant having at least two second condensation groups and (b) an amphipathic polymeric stabiliser which will concentrate at the interface between oil and water and which has recurring hydrophobic groups and recurring reactive hydrophilic groups which associate with the second condensation groups.

8. A process according to claim 1 in which the water immiscible liquid is a hydrocarbon liquid substantially free of halogenated hydrocarbon.

9. A process according to claim 8 in which the polymeric stabiliser is a random copolymer of at least one ionic ethylenically unsaturated monomer with at least one non-ionic water insoluble ethylenically unsaturated monomer.

10. A process according to claim 9 in which the ionic monomer is selected from acrylic acid, methacrylic acid and maleic acid (or anhydride) and the non-ionic monomer is selected from styrenes and fatty alkyl esters of ethylenically unsaturated carboxylic acid.

11. A process according to claim 1 in which the water-soluble IFC reactant is an amine, the oil-soluble IFC reactant is an acid or acid derivative, and the condensation polymer is a polyamide.

12. A process according to claim 1 in which the water-soluble IFC reactant is diethylene triamine.

13. A process according to claim 1 in which the oil-soluble IFC reactant is terephthaloyl chloride.

14. A process according to claim 1 in which the amount of aqueous core composition and water-soluble IFC reactant is 10%–70%, preferably 25%–60% by weight of the aqueous dispersion including oil-soluble IFC reactant.

15. A process according to claim 1 in which the dry weight of the core is 5% to 40% based on the dry weight of the aqueous dispersion.

16. A process according to claim 1 in which the amount of polymeric shell is 2% to 50% based on the dry weight of core plus shell.

17. A process according to claim 1 in which the core material comprises a polymer or materials which can polymerise to form a polymer matrix.

18. A process according to claim 17 in which the aqueous core composition comprises an aqueous solution or emulsion of polymeric material.

19. A process according to claim 1 in which the core material comprises a enzyme.

20. A process according to claim 1 conducted in the substantial absence of a water-in-oil emulsifier.

* * * * *